J. D. SCOTT.
APPARATUS FOR TREATING COALS AND OTHER HYDROCARBONACEOUS SUBSTANCES.
APPLICATION FILED OCT. 23, 1914.
1,190,957.
Patented July 11, 1916.
4 SHEETS—SHEET 1.
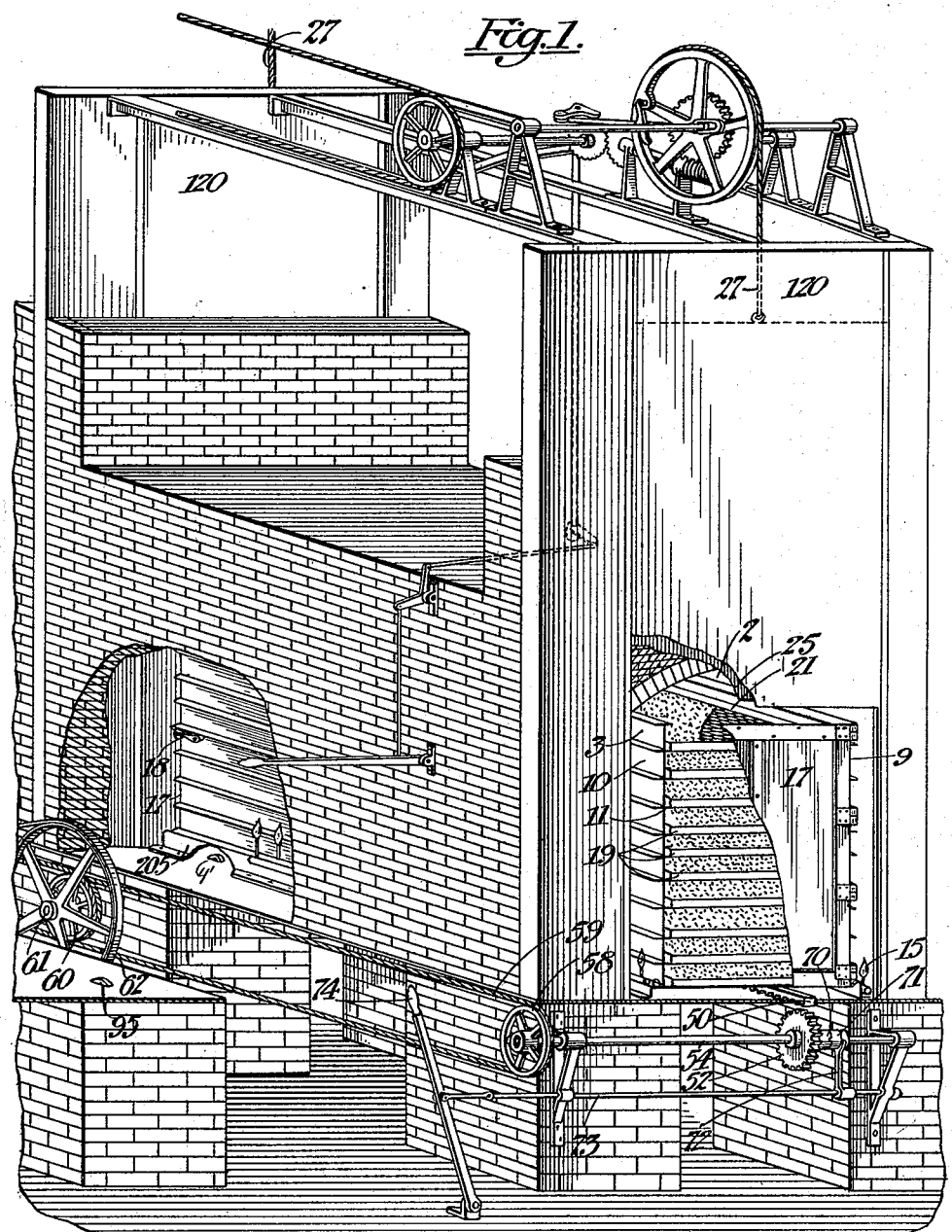

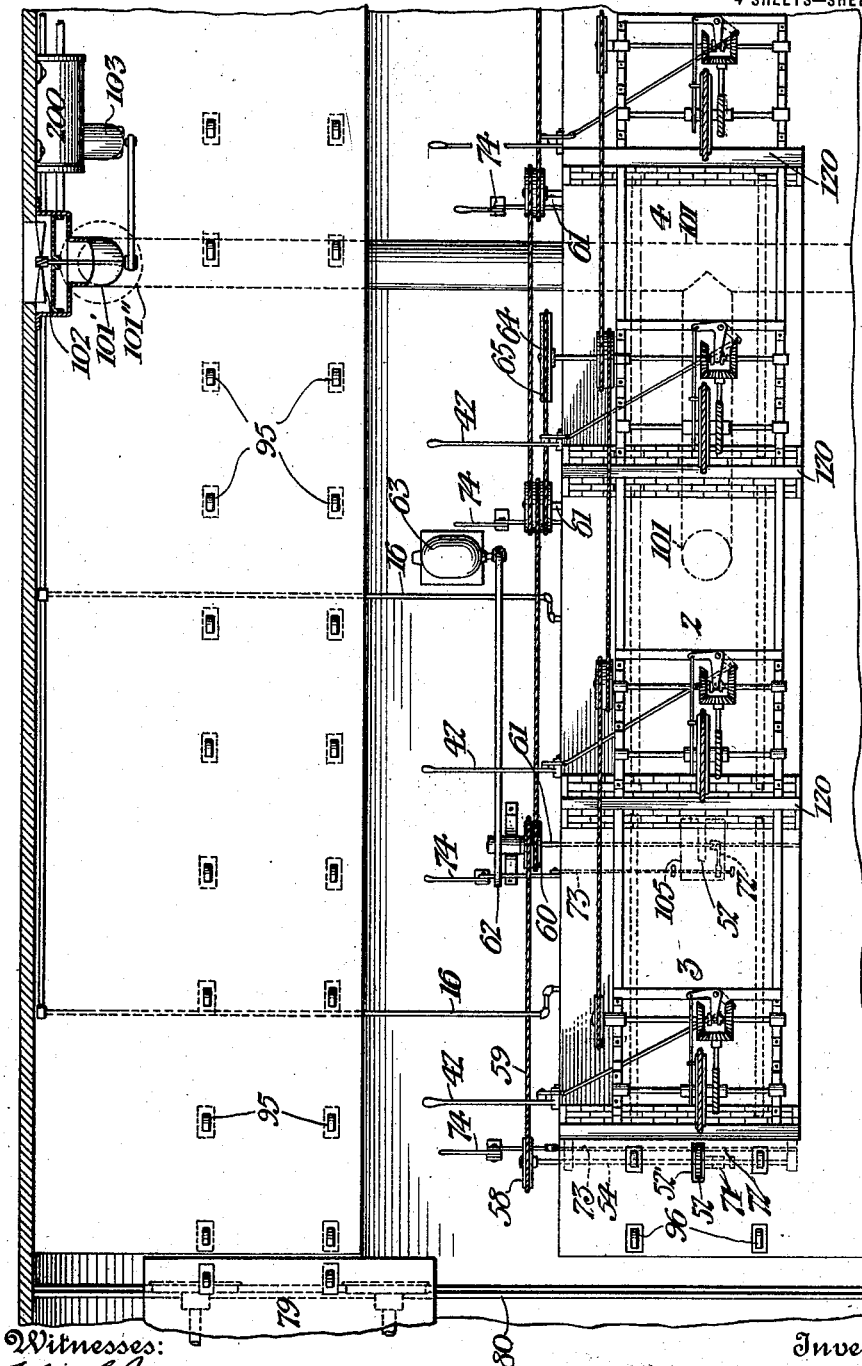

J. D. SCOTT.
APPARATUS FOR TREATING COALS AND OTHER HYDROCARBONACEOUS SUBSTANCES.
APPLICATION FILED OCT. 23, 1914.
1,190,957.
Patented July 11, 1916.
4 SHEETS—SHEET 3.
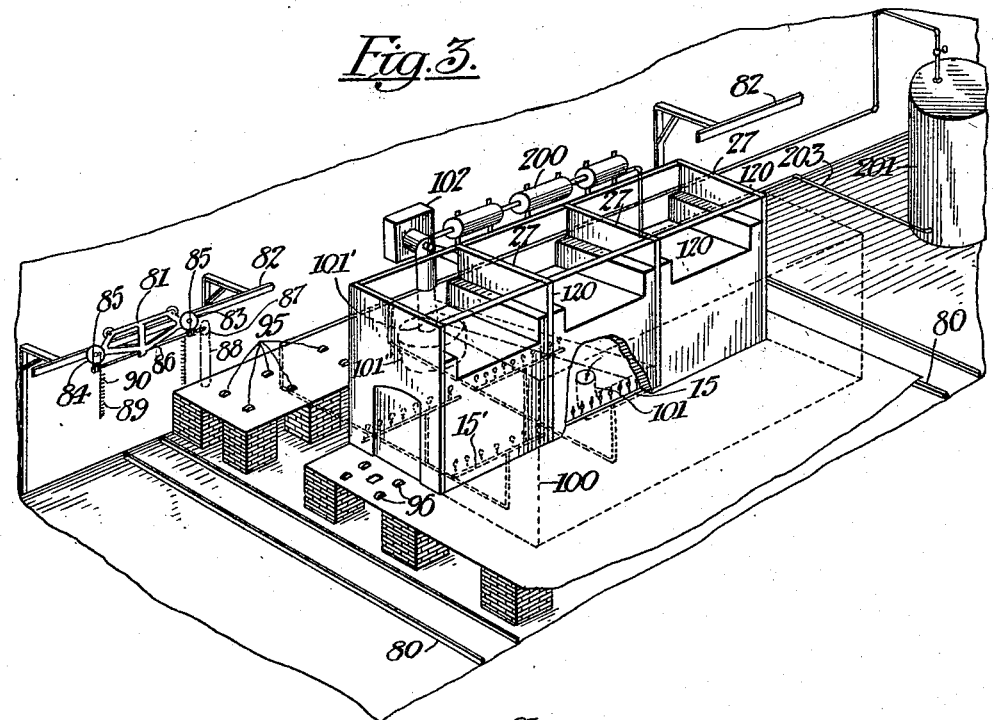
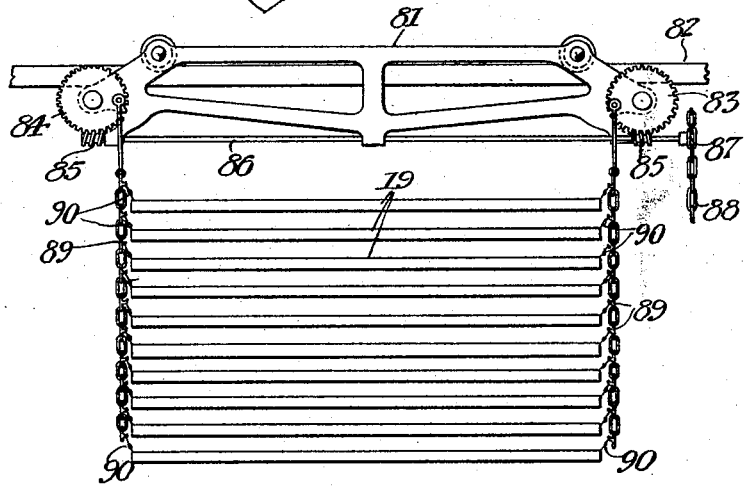
Witnesses:
Inventor
John Dunlap Scott.
By his Attorney

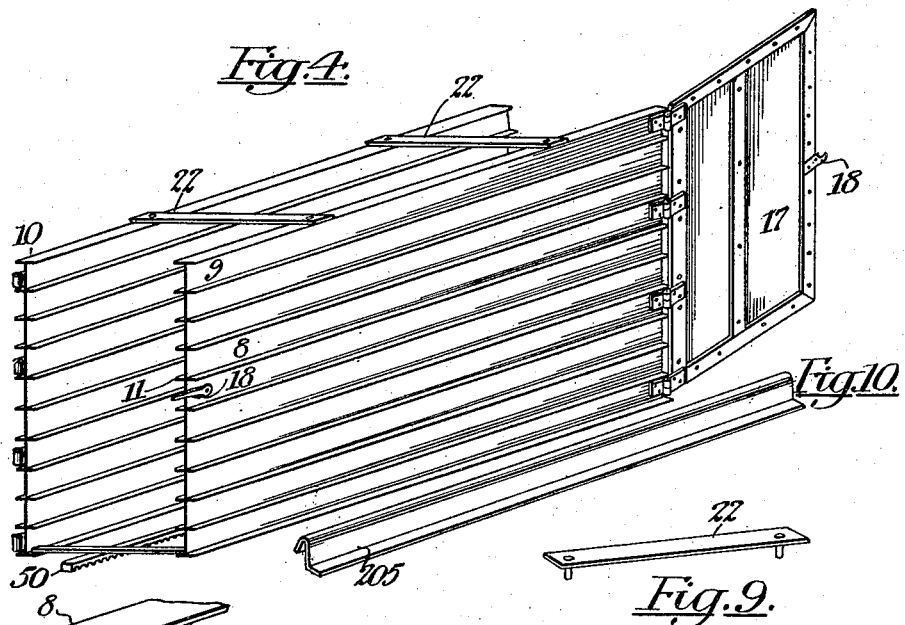
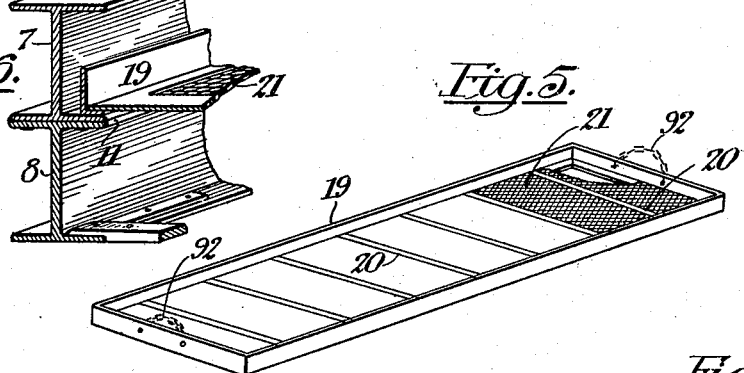
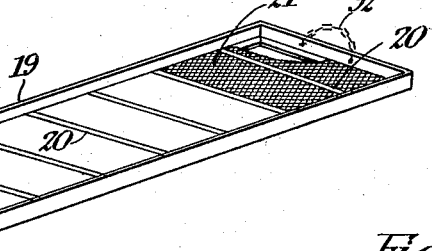
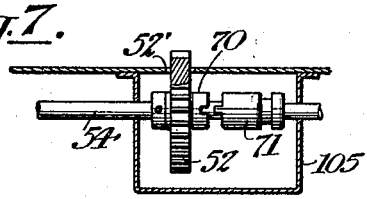
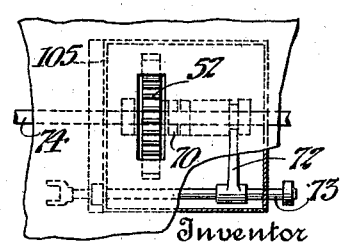

UNITED STATES PATENT OFFICE.

JOHN DUNLAP SCOTT, OF DETROIT, MICHIGAN.

APPARATUS FOR TREATING COALS AND OTHER HYDROCARBONACEOUS SUBSTANCES.

1,190,957. Specification of Letters Patent. Patented July 11, 1916.

Original application filed August 26, 1910, Serial No. 579,019. Divided and this application filed October 23, 1914. Serial No. 868,242.

*To all whom it may concern:*

Be it known that I, JOHN DUNLAP SCOTT, a citizen of the United States, residing at Detroit, in the county of Wayne and State of Michigan, have invented certain new and useful Improvements in Apparatus for Treating Coals and other Hydrocarbonaceous Substances, of which the following is a specification.

This invention relates to apparatus for treating coals, such for instance as cannel, bituminous and other coals having a high percentage of volatile matter, shales, lignites, and other carbonaceous substances so that a portion of their constituents may be converted into volatile hydrocarbonaceous oils, and such hydrocarbonaceous substances which yield when subjected to heat at certain temperatures vapors of heavy oils, waxes, naphthas, phenols and other products, and at higher temperatures yield tar, naphthalene, benzol, sulfur and other products of a more or less gaseous nature, and the object of the invention is to provide an improved apparatus so as to obtain by the treatment of these substances the maximum amount of the products which are thrown off at the lower temperatures without dissociating the initial products or producing any, or but a minimum quantity of, gaseous products; also to prevent the destruction by combustion of the residual coke produced by the treatment of cannel and other coals; also to promote the rapid, continuous, uniform, and practically simultaneous treatment or eduction of the entire charge of these substances; also to extract the volatile products of coals, shales and lignites and other hydrocarbonaceous substances by bringing into contact therewith a deoxidized gas and causing the same to pass therethrough and thus effect a thorough extraction of those products from the substances and greatly reduce the time required for educing or converting the charge into volatile hydrocarbonaceous oils, also to insure an uninterrupted movement of the heat currents through and out of the eduction chamber and their thorough and intimate contact with the coal or other charge therein; also to prevent the interruption of the movements of the heat currents and also to promote the rapid efflux of the vapors from the charge treating or eduction chamber and, by carrying them away from the inflowing heat as rapidly as they are thrown off, prevent the formation or dissociation of gaseous products.

The present application is a division of my application, Serial No. 579,019, filed August 26th, 1910, and allowed May 13th, 1914, and therefore the gist of the present improvement is the provision, in connection with an apparatus of the character described, of improved charge trays so constructed that the heat currents will circulate around and substantially through every part of the charge.

A further object of the invention is the provision of an improved tray carrier particularly adapted for use in an apparatus of the character described.

A further object of the invention is the provision of an improved means for separating the trays from such carrier. And generally, the object of the invention is the provision of improved devices and apparatus of the character described by means of which the results hereinbefore set forth may be quickly and readily and comparatively inexpensively obtained in a thorough and practical manner, and by means of which also the conversion of the charge into volatile hydrocarbonaceous oils will commence at a temperature of about 250 degrees F., so that when the temperature reaches about 700 degrees F., the conversion of practically all of the constituents of the charge which are capable of being converted into volatile hydrocarbonaceous oils can then be completed, and by means of which also an effective treatment of every portion of the charge is obtained, and this without the ignition of any part of the charge.

In the drawings accompanying and forming part of this specification, Figure 1 is a perspective elevation of the eduction chamber with portions thereof broken away to more effectively disclose the charge supporting trays and their carrier; Fig. 2 is a plan view of the apparatus; Fig. 3 is a perspective diagrammatic view of this improved apparatus, the figure also illustrating the crane for lifting the trays from the carrier; Fig. 4 is a perspective view of the tray carrier with the door at one end detached and the door at the opposite end open; Fig. 5 is a perspective view of one of the charge carrying trays with a part of its perforated or open-mesh bottom broken away; Fig. 6 is a detail enlarged view of a portion of the carrier shown in Fig. 4 supporting one corner of one of the trays; Figs. 7 and 8 are detail views of the means for operating the tray carrier and maintaining the chamber airtight at the points where the operating means is located under the chambers; Fig. 9 is a detail view of one of the bars which may be used for securing the side walls of the tray carrier together; Fig. 10 is a detail view of the means for preventing a backdraft between the tray carrier and the bottom of the chamber; and Fig. 11 is an enlarged view of the tray lifting crane.

Similar characters of reference indicate corresponding parts throughout the several figures of the drawings.

In this improved apparatus the substance to be treated, cannel coal or shale for example, is placed in trays supported by a suitable carrier or casing open at the bottom and top, but tightly closed at the sides, and at the ends by doors, and which carrier is inclosed in a chamber from which the air is excluded. In connection with this tray carrier or casing a heat producing apparatus is employed in such a manner that the products of combustion, such as a deoxidized or neutral gas, produced in the present instance by gas flame, will act directly on the sides of the tray carrier and also be carried into the carrier at the top thereof and down through the charge supported by the several trays, and thus be caused to impinge upon the coal or shale in the trays by passing over and through such trays. This tray carrier or casing connects directly or indirectly with suitable means for either forcing or drawing the vapors through a suitable connecting pipe into a condenser. In the present instance this means is shown as a fan or exhauster. The charge of coal or shale is placed in the casing of the eduction chamber and divided into a plurality of layers supported in such manner that the heat currents may readily pass down through the several layers from one to another.

In the present apparatus the gas flame used for producing the heat is brought in direct contact with the side walls of the tray carrier, thus doing away with the use of fires and fire chambers entirely separated from the carrier. The temperature within the eduction chamber is restrained or kept below the point where incandescence or red heat occurs, and usually varies between about 250 degrees F., at which temperature the eduction or conversion of the charge commences, and about 700 degrees F., at which temperature the complete separation of the volatile hydrocarbonaceous oils is usually obtained. When the temperature has reached about 250 degrees F., the exhauster is started and driven at such speed as to effectively draw the deoxidized gas into the tray carrier at the top thereof and downward through the several trays and thus over and through, the bodies of coal, whereby such deoxidized gas is caused to impinge upon the coal and thus convert or educe therefrom the vapors, which as they develop join with such heat currents and are caused to flow with them out of the eduction chamber as rapidly as they are formed, being then driven by the exhauster to a condenser, or to several thereof, where the vapors thus produced in the manner stated are condensed into heavy oils. The temperature of the products of combustion, or deoxidized gas, should be considerably below red heat to prevent the production of such gaseous products as are evolved at high temperatures, and the effect of these relatively low temperatures is to cause vapors and sprays of the heavy oils and waxes to be drawn out of the coal or shale, which vapors are swept rapidly away from the points where they develop and out of the eduction chamber and away from the incoming heat before dissociation can take place, by the free rapidly moving heat currents with which they mingle.

It will be observed that in the present apparatus the heat to which the charge is subjected is largely due to direct heat on the sides of the inner or removable chamber or tray carrier, so that the combustion gases merely tend to sweep away the oil vapors thus formed and give a direction to the currents of those oil vapors, whereas heretofore the heat was solely obtained from the high temperature combustion gases. Furthermore, the zigzag passing of the heated gases in the apparatus heretofore used tended to cool those gases, so that by the time they reached the bottom trays the eduction caused by them was very imperfect and the coke on the bottom trays was found to contain very much more volatile matter than the coke on the upper trays, but by means of the present apparatus, whereby the deoxidized gas passes not only over and under the trays, but also transversely through the charge, whether in the top or the bottom tray, every part of the charge is completely treated, so that substantially the same volatile matter is obtained from the lower trays as from the upper.

The apparatus shown herein for the treatment or eduction of the hydrocarbonaceous substances consists of an eduction chamber 2 having in front thereof and connected thereto a preliminary heating chamber 3, which in practice is preferably provided with an auxiliary heating apparatus by means of which the charge may be heated up preparatory to the conveyance thereof into the eduction chamber, whereby when carried into the latter chamber the charge will be more quickly heated and the volatile hydrocarbonaceous material extracted therefrom in a more rapid manner, thus materially reducing the time necessary for carrying out this improved process. At the rear of and connected with the eduction chamber is a cooling chamber 4, these chambers being separated from each other by suitable doors. This cooling chamber 4 permits the cycle of operations to go on continuously without the necessity of leaving the tray carrier in the eduction chamber for the purpose of being cooled, which would of course necessitate a gradual cooling down of the eduction chamber without the admission of any cold air, the admission of which would tend to ignite the charge. By the provision of this cooling chamber the charge can be gradually cooled without affecting the temperature in the eduction chamber, and it also prevents the ignition of the charge, which would immediately take place if the charge were brought into the open air instead of into the cooling chamber thus destroying the residual coke and seriously impairing the efficiency of the process. By this system of chambers, it will be observed that the eduction chamber 2 is always in condition for the reception of a new carrier containing a charge of material to be treated, and in the present improvement it will also be observed that this charge, when conveyed into the eduction chamber has already been heated to a predetermined temperature, so that in consequence the time required to completely treat or educe the charge in the eduction chamber is very much lessened, as well as better results obtained. These chambers are preferably formed by suitable masonry or concrete, and of a suitable size to receive a considerable number of trays.

The tray carrier 7 is shown herein made up of I-beams 8, the flanges of which are suitably bolted together, thus forming a pair of side walls 9 and 10, the inner flanges 11 projecting into the chamber of the carrier constituting the supports for the trays. The bottom walls of the chambers 2, 3 and 4 are provided with suitable supporting rollers one of which is shown at 4', Fig. 1, by means of which the carrier is readily run from one chamber into the other. The side walls of the chambers are also provided with rollers adapted to engage the sides, as for instance a pair of exterior flanges of the carrier, thereby to prevent sidewise play or lateral movement of the carrier and also to facilitate the shifting of the carrier.

Within the eduction chamber 2, and at the sides of the carrier chamber there are located gas pipes 15, one at each side of the carrier, having a series of jets such as Bunsen burners extending along the carrier throughout the length thereof adjacent to the bottom, and by means of which the heat for the conversion of the charge is obtained, the spaces between the sides of the carrier and the inner walls of the eduction chamber constituting flues or heat passages by means of which the deoxidized gas is drawn upward and over the top of the carrier. The preliminary heating chamber is also provided with similarly arranged gas jets 15' which are, however, located at somewhat greater distances apart than are those in the eduction chamber, this for the purpose of providing a less degree of heat in the preliminary heating chamber, so that the eduction or separation of the volatile hydrocarbonaceous material will not actually commence until the carrier has been shifted into the eduction chamber. These gas pipes are connected by suitable conduits 16 leading to a suitable source of supply.

The tray carrier is provided at each end with a door 17 hinged thereto and having a suitable catch 18 for tightly clamping it in position. The trays 19 are preferably formed of angle iron having suitable braces 20 supporting a perforated or reticulated bottom 21, shown herein as formed of wire mesh, by means of which the heated products of combustion or deoxidized gas may be drawn not only over but downwardly through the charge carried by the trays and thus from one tray to another from top to bottom thereof. The side walls of the carrier are suitably connected together by connecting members or bars 22 detachable to permit the trays to be separated from the carrier in the manner hereinafter described.

By forming the trays in the manner shown the necessity of arranging them in a zigzag formation is obviated, with the result that instead of the heated gases becoming cool by the time they reach the bottom of the trays, as heretofore, which resulted in an imperfect eduction so that the coke on the bottom trays contained much more volatile matter than that on the upper trays, a much more perfect eduction of all of the charge is not only obtained, but a more perfect eduction of the charge on the lower trays is the result, practical demonstration disclosing that by this improved apparatus a larger amount of volatile hydrocarbonaceous oils is obtained.

The chamber separating doors, together with the door 25 closing the front of the chamber 3, and a similar door, not shown, for closing the rear end of the chamber 4, are sliding doors mounted in suitable ways and attached to cables 27, one for each door, the manipulation of each of which cables and its door is controlled by an independent mechanism, whereby the door may be raised and lowered at the proper time. As the means for operating these doors constitutes the subject-matter of a contemporaneously filed application, a detailed description thereof in the present application is deemed unnecessary.

For shifting the tray carrier or carrier chamber from one of the compartments or chambers to the other of the eductor, suitable means is provided. In the present improvement each tray carrier is provided at its underside with a rack 50 of substantially the length of the carrier, this rack being located preferably centrally between the sides of the carrier to extend lengthwise thereof, and to project beyond one, as the front end of the carrier. This enables the carrier to be completely shifted from one chamber into another, for until the tray carrier is shifted entirely into the chamber, a part of the rack will remain in engagement with the gear. Located under each of the chambers 2, 3 and 4 and under the platform in front of the preliminary heating chamber 3 and at the rear of the cooling chamber is the carrier shifting mechanism, and as they are all similar the description of one of them is deemed sufficient. Each of these mechanisms comprises a gear 52 loosely mounted on a rotating shaft 54 and projects either above its platform in the front and rear of the eductor or through a slot 52' in the bottom of the several chambers 2, 3 and 4 to engage the rack 50. This slot 52' of each chamber is closed by the means hereinafter described so as to maintain such chambers air-tight. This rotating shaft 54 has a pulley wheel 58 connected by a belt 59 with another pulley wheel 60 mounted on a shaft 61, on which shaft there is also mounted a belt pulley 62 connected with a suitable source of power, as for instance the motor 63, which constitutes the source of power for raising and lowering the doors as well as for shifting the carriers.

For connecting the gear 52 to the rotating shaft 54 a clutch is used, see Figs. 7 and 8, one member as 70, being carried by the gear 52 and the other, as 71 keyed or splined to the shaft 54, and therefore rotating therewith. A clutch shifter 72 straddles the clutch member 71 and is connected to a sliding rod 73 linked to an operating handle 74. The manipulation of this handle 74 will engage or disengage the clutch members. When such members are engaged the gear 52 will be rotated with the shaft, and so shift the tray carrier, which when shifted into the proper position in a chamber will have the forward end of its rack pass from its shifting gear 52.

In practice when the carrier is brought by its truck, in front of the first chamber, the lever 74 adjacent to that chamber is manipulated, whereupon the gear 52 in mesh with the rear end of the rack of the tray carrier will be rotated, and thereupon shift the carrier into the first chamber. Thereupon, the door is lowered. When it is desired to shift this carrier in chamber 3 into the eduction chamber 2, the tray carrier in chamber 4 is first shifted by a similar rack mechanism to that just described from such chamber 4 and the rear door lowered. Thereupon the door 6 is raised and the carrier in the eduction chamber 2, with the residual coke, shifted by a rack shifting mechanism similar to that just described from the eduction chamber 2 to the cooling chamber 4 and the door 6 lowered. The door 5 is then raised and the carrier in chamber 3, by its rack shifting mechanism, then shifted into the eduction chamber 2 and the door 5 lowered, whereupon another carrier, with its loaded trays, may be shifted into the chamber 3 in readiness to be conveyed into the eduction chamber in the manner just described.

Located in front and rear of the apparatus is a truck track 80 for the tray carrier truck 79, (see Fig. 2) and to one side of the platform is a suitable crane 81 for lifting and separating the trays from the carrier. This crane runs upon a suitable track 82 and is provided with worm wheels 83 and 84 in mesh with right and left hand worms 85 carried by a shaft 86. On one end of the shaft is a sprocket or chain wheel 87 for a hand chain 88. Carried by each of the worm wheels 83 is a depending chain 89 having hooks 90, such hooks adapted to engage with projecting loops or rings 92 in the ends of the trays. When the trays have been properly loaded they are carried by the crane into position to be received by the tray carrier, which is mounted upon a truck movable upon the track 80. The trays being carried by the crane in the manner shown in Fig. 11, are conveyed lengthwise into the carrier above the tray supporting flanges, and to permit this the detachable brace bars 22 are removed. When they are in their proper position in the carrier the chain is manipulated to slightly lower the trays, whereupon they are brought into position to be supported upon the interior flanges 11 of the carrier, whereupon a further lowering of the chains 89 and the hooks 90 will release the trays from the crane and thereupon the crane can be removed. A similar means is provided for lifting the trays at the end of the chamber 4 for the purpose of dumping the trays with the coke or residual material therein.

For the purpose of shifting a carrier from the rear to the front of the apparatus, thereby to permit the carriers to be re-used, at one side of the apparatus I have shown the platform provided with suitable rollers 95, similar rollers 96 being located in front of the first chamber 3 to facilitate the shifting of the carrier into that chamber.

In practice a number of these apparatus may be provided, as shown by the dotted lines 100 in Fig. 3 which is intended to illustrate another system of chambers similar to that hereinbefore described, whereby any desired number of eductors may be in use at the same time, so that a certain quantity of material may be treated per day.

Communicating with the underside of the eduction chamber is a conduit 101 which leads to a suitable fan or exhauster 102, which may be driven from any suitable source of power, such for instance as a motor 103. This conduit 101 may have a drip outlet 101' emptying into a tank or tub 101'', see Fig. 3. This fan casing communicates with suitable condensers 200.

Since the eduction chamber, as well as the other chambers should be maintained air-tight and as the rack shifting gears are always in rack engaging position and therefore project through the bottoms of the chambers, some means must be provided to close the bottom wall of each of these chambers. For this purpose each of the gears 52 and its clutch, (excepting of course, the gear located in front of the preliminary heating chamber and in the rear of the cooling chamber,) is located in a tightly closed casing or box 105 secured to the underside of the chamber walls, the shaft 54 and rod 73 only projecting therefrom at one side. The platform in front of the preliminary heating chamber, and at the rear of the cooling chamber are each, as hereinbefore stated, provided with an opening for the projection of the gear 52, located respectively at the front and rear of these chambers, but as this opening is outside of the chamber no box such as 105 is necessary at this point. Otherwise the rack shifting mechanism for all of the chambers is the same. In practice the outer, that is the front and rear, doors of the apparatus will, subsequent to each loading of the chambers in the manner hereinbefore described, be made air-tight by the use of some suitable material, such as asbestos cement.

Above each of the doors 5 and 6 of the eduction chamber is located a hood 120, which is entirely closed at its top and on all sides, except the bottom, with the exception of the necessary opening for the passage of the chain or cable connected to the door. These hoods prevent the egress of the heated air from the eduction chamber as well as the ingress of cold air thereinto and permit the raising of the door the required distance to permit the shifting of the tray carrier.

By means of the present apparatus it will be observed that a uniform temperature can be maintained throughout the height of the carrier in view of the fact that the flame from the gas jets will impinge upon the outside surfaces of the carrier at points along the lower portion of the sides thereof thus heating the material on the trays at those points where it has heretofore been impracticable to obtain a sufficient amount of heat to complete the eduction of the volatile matter in the lower trays. Thus, the heat which is drawn up and over the top of the carrier and down through the trays is supplemented at the lower portion of the carrier by the heat which comes in contact with the carriers at this point owing to the location of the gas jets in the manner stated, so that the material in the lower trays is as effectively treated as is the material in the upper trays.

The apparatus above described, when applied to the treatment of coal, produces a very superior quality of coke as a result of the comparatively low temperature at which the treatment is carried on, that is below red heat or incandescence, with practically no tar or gaseous products being thrown off, no "coking" of the coal in the usual sense of that term taking place, and the residual coke differs from cokes as usually produced in its properties and approximates closely to charcoal, which it resembles in some of its characteristics, notably in its porosity, ease of ignition and free burning qualities.

The charge to be treated being located between the gas flames which are within the eduction chamber, and not without the same, greatly increases the rapidity and efficiency of the apparatus herein described, as the desired temperature within the eduction chamber is more quickly obtained, while a more uniform temperature results by reason of the fact that the heat radiates through the side walls of the carrier itself and the heat currents pass up over the top of the side walls of the carrier and down through the trays.

In the present improvement certain gases passing to the condensers 200 are incondensable, and these may be utilized for the purpose of providing the heat in the preliminary heating and eduction chambers, by conveying such gases from the condensers to a tank 201, and connecting the gas pipes 203 with such tank and thus utilizing these incondensable gases to supply heat for the extraction of the volatile oils.

In practice the bottom of the eduction chamber 2 will be provided with a low wall or partition 205 to inclose the sides of the carrier so as to prevent the heated currents from being drawn under the carrier instead of up through the flues and down through the carrier. These walls may have their upper edges bent over to overlap the lower outer flanges of the I-beams of the carrier.

The term reticulated herein is intended to cover a perforated or open mesh or reticulated bottom.

I claim as my invention:

1. In an apparatus of the class described, a tray carrier having its side walls made up of I-beams, with the flanges thereof forming tray supports and open at its bottom and top, the latter to permit the passage from end to end thereof of tray supporting means, and provided with doors at its ends.

2. In an apparatus of the class described, a tray carrier having its side walls made up of I-beams, with the flanges thereof forming tray supports and open at its bottom and top, the latter to permit the passage from end to end thereof of tray supporting means, and provided with doors at its ends, and trays supported on the flanges of said I-beams.

3. In an apparatus of the class described, a tray carrier having its side walls made up of I-beams with the flanges thereof forming tray supports and open at its bottom and top, the latter to permit the passage from end to end thereof of tray supporting means, and provided with doors at its ends, and trays supported on the flanges of said I-beams and each having a reticulated bottom.

4. In an apparatus of the class described, a tray carrier having its side walls made up of I-beams, with the flanges thereof forming tray supports and open at its bottom and top, the latter to permit the passage from end to end thereof of tray supporting means, and provided with doors at its ends, and removable trays supported on the flanges of said I-beams and each having a reticulated bottom.

5. In an apparatus of the class described, the combination of a shiftable tray carrier, superposed trays supported thereby, and means for raising said trays from the carrier and shifting the same bodily endwise therefrom.

6. In an apparatus of the class described, the combination of a tray carrier, superposed trays supported thereby, and means for raising all of said trays simultaneously from the carrier and shifting the same bodily endwise therefrom and comprising a crane having depending members carrying hooks adapted to engage loops at the ends of the trays.

7. In an apparatus of the class described, the combination of a tray carrier the side walls of which are made up of I-beams, trays carried by the opposed flanges of said I-beams, doors for the ends of said carrier, and means for raising the trays from the supporting flanges and shifting said trays bodily endwise from the carrier on the opening of the doors.

8. In an apparatus of the class described, the combination of a tray carrier the side walls of which are made up of I-beams, trays carried by the opposed flanges of said I-beams, doors for the ends of said carrier, and means for raising the trays from the supporting flanges and shifting said trays bodily endwise from the carrier on the opening of the doors, said carrier having removable braces.

9. In an apparatus of the class described, the combination of a tray carrier open at its top to permit the passage from end to end thereof of tray supporting means, and superposed trays each adapted for use only in an oil eduction furnace supported by said carrier and each having a reticulated bottom.

10. In an apparatus of the class described, the combination of a tray carrier, a rack located along the bottom thereof, and means for engaging said rack to shift the carrier lengthwise, superposed trays supported by said carrier, and means for raising said trays from the carrier and shifting the same bodily endwise therefrom.

11. In an apparatus of the class described, the combination of a tray carrier, a rack located along the bottom midway thereof, means for engaging said rack to shift the carrier lengthwise, superposed trays supported by said carrier, and means for raising said trays from the carrier and shifting the same bodily endwise therefrom.

12. In an apparatus of the class described, the combination of a tray carrier, a rack located along the bottom midway thereof, means for engaging said rack to shift the carrier lengthwise, superposed trays supported by said carrier, and means for raising said trays from the carrier and shifting the same bodily endwise therefrom, each of said trays having a reticulated bottom.

13. A tray adapted only for use in an oil eduction furnace and having a reticulated bottom and having at its ends supporting means for the reception of tray carrying cables.

14. A tray carrier comprising a pair of side walls having a door at each end, and removable means for connecting said side walls.

15. A tray carrier comprising a pair of side walls having a door at each end, removable means for connecting said side walls, and a rack located along the bottom of said carrier.

16. In an apparatus of the class described, a tray carrier adapted for use only in an oil eduction furnace having its opposed side walls provided with tray supporting means, said tray carrier being open at its top to permit the passage from end to end thereof of tray supporting means.

17. In an apparatus of the class described, a tray carrier having its opposed side walls provided with tray supporting means, said tray carrier being open at its top to permit the passage from end to end thereof of tray supporting means and having an end provided with a door.

18. In an apparatus of the class described, a tray carrier having its opposed side walls provided with tray supporting means, said tray carrier being open at its top to permit the passage from end to end thereof of tray supporting means and having both ends thereof provided with doors.

19. In an apparatus of the class described, the combination of a tray carrier having its opposed walls provided with supporting means, trays carried by said supporting means, doors for the ends of said carrier, and means for raising the trays from the carrier supporting means and shifting said trays bodily endwise from said carrier on the opening of the doors.

20. In an apparatus of the class described, the combination of a tray carrier having its opposed walls provided with supporting means, trays carried by said supporting means, doors for the ends of said carrier, and means for raising the trays from the carrier supporting means and shifting said trays bodily endwise from said carrier on the opening of the doors, said carrier having removable braces.

21. In an apparatus of the class described, the combination of a tray carrier open at its top to permit the passage from end to end thereof of tray supporting means, superposed trays supported by said carrier and each having a reticulated bottom, and means shiftable lengthwise of the carrier for removing or replacing the trays.

JOHN DUNLAP SCOTT.

Witnesses:
  BEN PHEAN,
  L. RAMILLOS JEFFREY.

Copies of this patent may be obtained for five cents each, by addressing the "Commissioner of Patents, Washington, D. C."